United States Patent
Lin et al.

(10) Patent No.: US 11,053,348 B2
(45) Date of Patent: Jul. 6, 2021

(54) EPOXY STABILIZATION USING METAL NANOPARTICLES AND NITROGEN-CONTAINING CATALYSTS, AND METHODS

(71) Applicant: 3M INNOVATIVE PROPERTIES COMPANY, St. Paul, MN (US)

(72) Inventors: Ying Lin, Woodbury, MN (US); Hassan Sahouani, Hastings, MN (US); Guy D. Joly, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 225 days.

(21) Appl. No.: 16/471,885

(22) PCT Filed: Feb. 8, 2018

(86) PCT No.: PCT/US2018/017315
§ 371 (c)(1),
(2) Date: Jun. 20, 2019

(87) PCT Pub. No.: WO2018/151993
PCT Pub. Date: Aug. 23, 2018

(65) Prior Publication Data
US 2020/0087447 A1    Mar. 19, 2020

Related U.S. Application Data

(60) Provisional application No. 62/459,126, filed on Feb. 15, 2017.

(51) Int. Cl.
| | | |
|---|---|---|
| C08G 59/66 | (2006.01) | |
| C08K 3/08 | (2006.01) | |
| C08K 3/26 | (2006.01) | |
| C08K 3/36 | (2006.01) | |
| C08G 59/24 | (2006.01) | |
| C08G 59/68 | (2006.01) | |
| H01B 3/00 | (2006.01) | |
| H01B 3/30 | (2006.01) | |

(52) U.S. Cl.
CPC ........... *C08G 59/66* (2013.01); *C08G 59/245* (2013.01); *C08G 59/686* (2013.01); *C08K 3/08* (2013.01); *C08K 3/26* (2013.01); *C08K 3/36* (2013.01); *H01B 3/004* (2013.01); *H01B 3/307* (2013.01); *C08K 2003/085* (2013.01); *C08K 2003/0806* (2013.01); *C08K 2003/265* (2013.01); *C08K 2201/005* (2013.01)

(58) Field of Classification Search
CPC .... C08G 59/66; C08G 59/245; C08G 59/686; C08K 3/08; C08K 3/26; C08K 3/36; C08K 2003/0806; C08K 2003/085; C08K 2003/265; C08K 2201/005; H01B 3/004; H01B 3/307
USPC ........................................................ 524/440
See application file for complete search history.

(56) References Cited

U.S. PATENT DOCUMENTS

| | | | |
|---|---|---|---|
| 3,496,250 A | 2/1970 | Czerwinski | |
| 4,546,155 A | 10/1985 | Hirose | |
| 5,077,376 A | 12/1991 | Dooley | |
| 5,430,112 A * | 7/1995 | Sakata | C08G 59/184 525/504 |
| 5,464,910 A | 11/1995 | Nakatsuka | |
| 6,653,371 B1 | 11/2003 | Burns | |
| 2014/0272287 A1 | 9/2014 | Cai | |

FOREIGN PATENT DOCUMENTS

| | | |
|---|---|---|
| EP | 0138465 | 4/1985 |
| EP | 0193068 | 9/1986 |
| EP | 0594133 | 4/1994 |
| EP | 1291390 | 3/2003 |
| GB | 1121196 | 7/1968 |
| JP | H10298526 | 11/1998 |
| JP | 2006202604 | 8/2006 |
| JP | 2006202604 A * | 8/2006 |
| WO | WO 2012-059558 | 5/2012 |
| WO | WO 2018-109617 | 6/2018 |
| WO | WO 2018-111637 | 6/2018 |

OTHER PUBLICATIONS

Zhang, "Fast preparation of printable highly conductive polymer nanocomposites by thermal decomposition of silver carboxylate and sintering of silver nanoparticles", ACS Applied Materials & Interfaces, 2010, vol. 2, No. 9, pp. 2637-2645.

* cited by examiner

*Primary Examiner* — Kelechi C Egwim
(74) *Attorney, Agent, or Firm* — Adrian L. Pishko

(57) ABSTRACT

The present disclosure provides a curable, one-part epoxy/thiol resin composition. The composition comprises an epoxy/thiol resin mixture including: an epoxy resin component including an epoxy resin having at least two epoxide groups per molecule, a thiol component including a polythiol compound having at least two primary thiol groups, and a nitrogen-containing catalyst for the epoxy resin. The epoxy/thiol resin mixture further includes metal nanoparticles (e.g., silver nanoparticles, copper nanoparticles, or both), dispersed in the epoxy/thiol resin mixture. The present disclosure provides a method of curing a curable, one-part epoxy/thiol resin composition, including providing a curable, one-part epoxy/thiol resin composition and heating the composition to a temperature of at least 50° C.

14 Claims, No Drawings

EPOXY STABILIZATION USING METAL NANOPARTICLES AND NITROGEN-CONTAINING CATALYSTS, AND METHODS

CROSS REFERENCE TO RELATED APPLICATIONS

This application is a national stage filing under 35 U.S.C. 371 of PCT/US2018/017315, filed Feb. 8, 2018, which claims the benefit of U.S. Application No. 62/459,126, filed Feb. 15, 2017, the disclosure of which is incorporated by reference in their entirety herein.

FIELD

The present disclosure relates to curable epoxy-based compositions and methods of curing epoxy-based compositions.

BACKGROUND

Curable epoxy-based compositions are well known. Such compositions are used as adhesives, coating agents, sealing agents, and casting agents. Epoxy-based compositions are also used in the electronics industry, e.g., for cell phone assembly. Epoxy/polythiol-containing compositions conventionally have been used as two-part compositions. This was due at least in part to the instability of a one-part composition that includes an epoxy resin, a polythiol curing agent, and a liquid (soluble) tertiary amine catalyst. Such one-part compositions in which the epoxy resin, polythiol, and the catalyst are admixed at room temperature typically have working or "pot" lives on the order of minutes to a few hours. These properties impose practical restrictions on end-use applications of such compositions. Accordingly, many traditional epoxy/polythiol compositions have been formulated as two-part compositions.

Commercially available latent curing agents used in one-part epoxy resin adhesive formulations ordinarily provide such formulations with a combination of good storage stability and moderate reactivity at elevated temperatures. Examples of such commercially available latent curing agents include dicyandiamide and dibasic acid dihydrazide. These curing agents are useful in formulating epoxy resin compositions with excellent storage stability; however, to achieve cure, these curing agents ordinarily require heating to temperatures greater than 150° C. for extended periods of time.

In the electronics industry, it is desirable to provide epoxy-based compositions with thermal cure profiles tailored to specific application temperature requirements. Such cure profile tailoring assists in maintaining the integrity of the electronic components during the bonding process in, e.g., cell phone assembly. In addition, it is desirable for such compositions to have extended room temperature pot lives so that the composition may be applied to a larger number of parts over an extended period of time. This prolongs the useable application life of the compositions, thereby ensuring reproducible dispensing properties.

Advances in the electronics industry have made precise deposition of assembly adhesives a critical processing parameter, particularly in view of high throughput demand and process efficiency. The increasingly popular smaller-sized microelectronic components has made precise deposition of solder or adhesives for device assembly that much more important. Where precise adhesive deposition does not occur—either due to adhesive deposition technique imprecision, or spreading of the adhesive due to inappropriate rheological properties for the particular application, or both—surface mounting of components may not occur at all, and even when mounting does occur, the mounting may not occur in a commercially acceptable manner.

Heretofore, the desirability of balancing reactivity with pot life in curable one-part epoxy-based compositions has been recognized. Notwithstanding the state of the art, it is desirable to provide epoxy compositions with improved storage stability at room temperature, particularly with respect to viscosity maintenance over time, as well as with extended working lives at room temperature and relatively short curing times at elevated temperatures.

SUMMARY

The present disclosure relates to curable, one-part epoxy/thiol resin compositions, and methods of curing the compositions.

In a first aspect, the present disclosure provides a curable, one-part epoxy/thiol resin composition. The composition comprises an epoxy/thiol resin mixture including: an epoxy resin component including an epoxy resin having at least two epoxide groups per molecule, a thiol component including a polythiol compound having at least two primary thiol groups, and a nitrogen-containing catalyst for the epoxy resin. The epoxy/thiol resin mixture further includes metal nanoparticles (e.g., silver nanoparticles, copper nanoparticles, or both), dispersed in the epoxy/thiol resin mixture.

In a second aspect, the present disclosure provides a method of curing a curable, one-part epoxy/thiol resin composition. The method comprises providing a curable, one-part epoxy/thiol resin composition including: an epoxy resin component including an epoxy resin having at least two epoxide groups per molecule, a thiol component including a polythiol compound having at least two primary thiol groups, and a nitrogen-containing catalyst for the epoxy resin; and metal nanoparticles (e.g., silver nanoparticles, copper nanoparticles, or both), dispersed in the epoxy/thiol resin mixture. The method further includes heating the curable, one-part epoxy/thiol resin composition to a temperature of at least 50° C.

The above summary of the present disclosure is not intended to describe each disclosed embodiment or every implementation of the present invention. The description that follows more particularly exemplifies illustrative embodiments. In several places throughout the application, guidance is provided through lists of examples, in which examples may be used in various combinations. In each instance, the recited list serves only as a representative group and should not be interpreted as an exclusive list. Thus, the scope of the present disclosure should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Although various theories and possible mechanisms may have been discussed herein, in no event should such discussions serve to limit the claimable subject matter.

DETAILED DESCRIPTION

The present disclosure relates to catalyst-containing particles, as well as curable, one-part epoxy/thiol resin compositions, and methods of making the particles and curing the compositions.

The term "aliphatic" refers to C1-C40, suitably C1-C30, straight or branched chain alkenyl, alkyl, or alkynyl which may or may not be interrupted or substituted by one or more heteroatoms such as O, N, or S.

The term "cycloaliphatic" refers to cyclized aliphatic C3-C30 groups such as C3-C20 groups and includes those interrupted by one or more heteroatoms such as O, N, or S.

The term "alkyl" refers to a monovalent group that is a radical of an alkane and includes straight-chain, branched, cyclic, and bicyclic alkyl groups, and combinations thereof, including both unsubstituted and substituted alkyl groups. Unless otherwise indicated, the alkyl groups typically contain from 1 to 30 carbon atoms. In some embodiments, the alkyl groups contain 1 to 20 carbon atoms, 1 to 10 carbon atoms, 1 to 6 carbon atoms, 1 to 4 carbon atoms, or 1 to 3 carbon atoms. Examples of "alkyl" groups include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, norbornyl, and the like.

The term "alkylene" refers to a divalent group that is a radical of an alkane and includes groups that are linear, branched, cyclic, bicyclic, or a combination thereof. Unless otherwise indicated, the alkylene group typically has 1 to 30 carbon atoms. In some embodiments, the alkylene group has 1 to 20 carbon atoms, 1 to 10 carbon atoms, 1 to 6 carbon atoms, or 1 to 4 carbon atoms. Examples of "alkylene" groups include methylene, ethylene, 1,3-propylene, 1,2-propylene, 1,4-butylene, 1,4-cyclohexylene, and 1,4-cyclohexyldimethylene.

The term "aromatic" refers to C3-C40, suitably C3-C30, aromatic groups including both carbocyclic aromatic groups as well as heterocyclic aromatic groups containing one or more of the heteroatoms, O, N, or S, and fused ring systems containing one or more of these aromatic groups fused together.

The term "aryl" refers to a monovalent group that is aromatic and, optionally, carbocyclic. The aryl has at least one aromatic ring. Any additional rings can be unsaturated, partially saturated, saturated, or aromatic. Optionally, the aromatic ring can have one or more additional carbocyclic rings that are fused to the aromatic ring. Unless otherwise indicated, the aryl groups typically contain from 6 to 30 carbon atoms. In some embodiments, the aryl groups contain 6 to 20, 6 to 18, 6 to 16, 6 to 12, or 6 to 10 carbon atoms. Examples of an aryl group include phenyl, naphthyl, biphenyl, phenanthryl, and anthracyl.

The term "arylene" refers to a divalent group that is aromatic and, optionally, carbocyclic. The arylene has at least one aromatic ring (e.g., phenylene). Optionally, the aromatic ring can have one or more additional carbocyclic rings that are fused to the aromatic ring. Any additional rings can be unsaturated, partially saturated, or saturated. Unless otherwise specified, arylene groups often have 6 to 20 carbon atoms, 6 to 18 carbon atoms, 6 to 16 carbon atoms, 6 to 12 carbon atoms, or 6 to 10 carbon atoms.

The term "aralkyl" refers to a monovalent group that is an alkyl group substituted with an aryl group (e.g., as in a benzyl group). The term "alkaryl" refers to a monovalent group that is an aryl substituted with an alkyl group (e.g., as in a tolyl group). Unless otherwise indicated, for both groups, the alkyl portion often has 1 to 10 carbon atoms, 1 to 6 carbon atoms, or 1 to 4 carbon atoms and an aryl portion often has 6 to 20 carbon atoms, 6 to 18 carbon atoms, 6 to 16 carbon atoms, 6 to 12 carbon atoms, or 6 to 10 carbon atoms.

The term "nanoparticle" refers to a particle (a primary particle or a particle agglomerate) having an average particle diameter in the range of 0.1 to 1000 nanometers such as in the range of 0.1 to 500 nanometers or in the range of 1 to 100 nanometers. The term "diameter" refers not only to the diameter of substantially spherical particles but also to the longest dimension of non-spherical particles (or agglomerates thereof); suitable techniques for measuring the average particle diameter include, for example, scanning tunneling microscopy, light scattering, and transmission electron microscopy. In this context, "agglomeration" refers to a weak association between particles which may be held together by charge or polarity and can be broken down into smaller entities.

Herein, the term "comprises" and variations thereof do not have a limiting meaning where these terms appear in the description and claims. Such terms will be understood to imply the inclusion of a stated step or element or group of steps or elements but not the exclusion of any other step or element or group of steps or elements. "Consisting of" refers to including, and limited to, whatever follows the phrase "consisting of" Thus, the phrase "consisting of" indicates that the listed elements are required or mandatory, and that no other elements may be present. "Consisting essentially of" refers to including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof).

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and in certain embodiments, preferably, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein, the term "room temperature" refers to a temperature of 22° C. to 25° C.

The term "in the range" or "within a range" (and similar statements) includes the endpoints of the stated range.

Reference throughout this specification to "one embodiment," "an embodiment," "certain embodiments," or "some embodiments," etc., means that a particular feature, configuration, composition, or characteristic described in connection with the embodiment is included in at least one embodiment of the invention. Thus, the appearances of such phrases in various places throughout this specification are not necessarily referring to the same embodiment of the invention. Furthermore, the particular features, configurations, compositions, or characteristics may be combined in any suitable manner in one or more embodiments.

The present disclosure provides a curable, one-part epoxy/thiol resin composition that comprises: an epoxy/thiol resin mixture comprising: an epoxy resin component comprising an epoxy resin having at least two epoxide groups per molecule; a thiol component comprising a polythiol compound having at least two primary thiol groups; and a nitrogen-containing catalyst for the epoxy resin; and silver nanoparticles, copper nanoparticles, or both, dispersed in the epoxy/thiol resin mixture. In this context "one-part" means that all components, including the thiol curing agent, the nitrogen-containing catalyst, the metal (e.g., copper and/or silver) nanoparticles, and any optional additives are admixed with the epoxy resin.

The curable epoxy/thiol resin compositions of the present disclosure show improved storage stability at room temperature, particularly with respect to viscosity maintenance over time, as well as with extended working lives at room temperature and relatively short curing times at elevated temperatures. In certain embodiments, the curable epoxy/thiol resin compositions are stable at room temperature for a period of at least 5 days, at least 1 week, at least 2 weeks, at least 3 weeks, at least 4 weeks, or at least 5 weeks. In this context, "stable" means that the epoxy/thiol composition remains in a curable form.

Through the use of metal particles that have an affinity for thiol and/or amine functional groups, epoxy/thiol reactive one-part adhesives can be made which cure at temperatures as low as 50° C. while remaining room temperature stable for at least several days longer than without use of the metal particles. The compositions provide long term stability without negatively affecting cure temperature or material properties.

It is believed that the metal particles prevent the nitrogen-containing catalyst (and optionally also the thiol curing agent) from curing the epoxy resin (or any other thermoset polymer) for a period of time (e.g., at least 3 days) because the affinity between the nitrogen-containing catalyst and the metal of the metal nanoparticles minimizes interaction between the nitrogen-containing catalyst and the epoxy resin (or any other thermoset polymer). To react with the epoxy resin (or any other thermoset polymer), the nitrogen-containing catalyst typically disassociates from the metal nanoparticles upon exposure to heat. Similarly, the affinity between the thiol curing agent and the metal of the metal nanoparticles minimizes interaction between the thiol curing agent and the epoxy resin (or any other thermoset polymer) prior to heating the epoxy/thiol resin composition.

The curable epoxy/thiol resin compositions possess good low temperature curability. In certain embodiments, the curable epoxy/thiol resin composition is curable at a temperature of at least 50° C. In certain embodiments, the curable epoxy/thiol resin composition is curable at a temperature of up to 90° C. In certain embodiments, the curable epoxy/thiol composition is curable at a temperature of 60-65° C. Hence, it is not necessary to heat the compositions to high temperatures (e.g., greater than 90° C.) to initiate cure.

Curable epoxy/thiol resin compositions of the present disclosure are thus suitable for use in temperature sensitive bonding applications, particularly in the electronics industry, e.g., in cell phone assembly and bonding of plastic and metal parts. They may also be used in a variety of other applications, such as in the automotive and aerospace industries for parts bonding.

In a first aspect, a curable, one-part epoxy/thiol resin composition is provided. More particularly, a curable, one-part epoxy/thiol resin composition comprises:
an epoxy/thiol resin mixture comprising:
an epoxy resin component comprising an epoxy resin having at least two epoxide groups per molecule;
a thiol component comprising a polythiol compound having at least two primary thiol groups; and
a nitrogen-containing catalyst for the epoxy resin; and
metal nanoparticles (e.g., silver nanoparticles, copper nanoparticles, or both), dispersed in the epoxy/thiol resin mixture.

In a second aspect, a method of curing a curable, one-part epoxy/thiol resin composition is provided. More particularly, a method of curing a curable, one-part epoxy/thiol resin composition comprises:
providing a curable, one-part epoxy/thiol resin composition comprising:
an epoxy resin component comprising:
an epoxy resin having at least two epoxide groups per molecule;
a thiol component comprising a polythiol compound having at least two primary thiol groups; and
a nitrogen-containing catalyst for the epoxy resin; and
metal nanoparticles (e.g., silver nanoparticles, copper nanoparticles, or both), dispersed in the epoxy/thiol resin mixture; and
heating the curable, one-part epoxy/thiol resin composition to a temperature of at least 50° C.

The below disclosure relates to both of the first and second aspects.

Epoxy Resin Component

The epoxy resin component included in the curable epoxy/thiol resin composition contains an epoxy resin that has at least two epoxy functional groups (i.e., oxirane groups) per molecule. As used herein, the term oxirane group refers to the following divalent group.

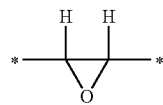

The asterisks denote a site of attachment of the oxirane group to another group. If an oxirane group is at the terminal position of the epoxy resin, the oxirane group is typically bonded to a hydrogen atom.

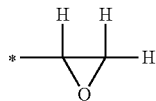

This terminal oxirane group is often part of a glycidyl group.

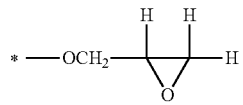

The epoxy resin includes a resin with at least two oxirane groups per molecule. For example, an epoxy compound can have 2 to 10, 2 to 6, or 2 to 4 oxirane groups per molecule. The oxirane groups are usually part of a glycidyl group.

Epoxy resins can include a single material or mixture of materials (e.g., monomeric, oligomeric, or polymeric compounds) selected to provide the desired viscosity characteristics before curing and to provide the desired mechanical properties after curing. If the epoxy resin includes a mixture of materials, at least one of the epoxy resins in the mixture is usually selected to have at least two oxirane groups per molecule. For example, a first epoxy resin in the mixture can have two to four or more oxirane groups and a second epoxy resin in the mixture can have one to four oxirane groups. In some of these examples, the first epoxy resin is a first glycidyl ether with two to four glycidyl groups and the second epoxy resin is a second glycidyl ether with one to four glycidyl groups.

The portion of the epoxy resin that is not an oxirane group (i.e., an epoxy resin compound minus the oxirane groups) can be aromatic, aliphatic, or a combination thereof and can be linear, branched, cyclic, or a combination thereof. The aromatic and aliphatic portions of the epoxy resin can include heteroatoms or other groups that are not reactive with the oxirane groups. That is, the epoxy resin can include halo groups, oxy groups such as in an ether linkage group, thio groups such as in a thio ether linkage group, carbonyl groups, carbonyloxy groups, carbonylimino groups, phosphono groups, sulfono groups, nitro groups, nitrile groups, and the like. The epoxy resin can also be a silicone-based material such as a polydiorganosiloxane-based material.

Although the epoxy resin can have any suitable molecular weight, the weight average molecular weight is usually at least 100 grams/mole, at least 150 grams/mole, at least 175 grams/mole, at least 200 grams/mole, at least 250 grams/mole, or at least 300 grams/mole. The weight average molecular weight can be up to 50,000 grams/mole or even higher for polymeric epoxy resins. The weight average molecular weight is often up to 40,000 grams/mole, up to 20,000 grams/mole, up to 10,000 grams/mole, up to 5,000 grams/mole, up to 3,000 grams/mole, or up to 1,000 grams/mole. For example, the weight average molecular weight can be in the range of 100 to 50,000 grams/mole, in the range of 100 to 20,000 grams/mole, in the range of 10 to 10,000 grams/mole, in the range of 100 to 5,000 grams/mole, in the range of 200 to 5,000 grams/mole, in the range of 100 to 2,000 grams/mole, in the range of 200 to 2,000 grams/mole, in the range of 100 to 1,000 grams/mole, or in the range of 200 to 1,000 grams/mole.

Suitable epoxy resins are typically a liquid at room temperature; however, solid epoxy resins that can be dissolved in one of the other components of the composition, such as a liquid epoxy resin, can be used if desired. In most embodiments, the epoxy resin is a glycidyl ether. Exemplary glycidyl ethers can be of Formula (I).

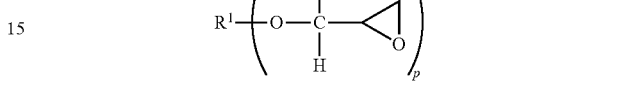

In Formula (I), group $R^1$ is a polyvalent group that is aromatic, aliphatic, or a combination thereof. Group $R^1$ can be linear, branched, cyclic, or a combination thereof. Group $R^1$ can optionally include halo groups, oxy groups, thio groups, carbonyl groups, carbonyloxy groups, carbonylimino groups, phosphono groups, sulfono groups, nitro groups, nitrile groups, and the like. Although the variable p can be any suitable integer greater than or equal to 2, p is often an integer in the range of 2 to 10, in the range of 2 to 6, or in the range of 2 to 4.

In some embodiments, the epoxy resin is a polyglycidyl ether of a polyhydric phenol, such as polyglycidyl ethers of bisphenol A, bisphenol F, bisphenol AD, catechol, and resorcinol. In some embodiments, the epoxy resin is a reaction product of a polyhydric alcohol with epichlorohydrin. Exemplary polyhydric alcohols include butanediol, polyethylene glycol, and glycerin. In some embodiments, the epoxy resin is an epoxidised (poly)olefinic resin, epoxidised phenolic novolac resin, epoxidised cresol novolac resin, and cycloaliphatic epoxy resin. In some embodiments, the epoxy resin is a glycidyl ether ester, such as that which can be obtained by reacting a hydroxycarboxylic acid with epichlorohydrin, or a polyglycidyl ester, such as that which can be obtained by reacting a polycarboxylic acid with epichlorohydrin. In some embodiments, the epoxy resin is a urethane-modified epoxy resin. Various combinations of two or more epoxy resins can be used if desired.

In some exemplary epoxy resins of Formula (I), the variable p is equal to 2 (i.e., the epoxy resin is a diglycidyl ether) and IV includes an alkylene (i.e., an alkylene is a divalent radical of an alkane and can be referred to as an alkane-diyl), heteroalkylene (i.e., a heteroalkylene is a divalent radical of a heteroalkane and can be referred to as a heteroalkane-diyl), arylene, or combination thereof. Suitable alkylene groups often have 1 to 20 carbon atoms, 1 to 12 carbon atoms, 1 to 8 carbon atoms, or 1 to 4 carbon atoms. Suitable heteroalkylene groups often have 2 to 50 carbon atoms, 2 to 40 carbon atoms, 2 to 30 carbon atoms, 2 to 20 carbon atoms, 2 to 10 carbon atoms, or 2 to 6 carbon atoms with 1 to 10 heteroatoms, 1 to 6 heteroatoms, or 1 to 4 heteroatoms. The heteroatoms in the heteroalkylene can be selected from oxy, thio, or —NH— groups but are often oxy groups. Suitable arylene groups often have 6 to 18 carbon atoms or 6 to 12 carbon atoms. For example, the arylene can be phenylene, fluorenylene, or biphenylene. Group IV can further optionally include halo groups, oxy groups, thio groups, carbonyl groups, carbonyloxy groups, carbonylimino groups, phosphono groups, sulfono groups, nitro groups, nitrile groups, and the like. The variable p is usually an integer in the range of 2 to 4.

Some epoxy resins of Formula (I) are diglycidyl ethers where IV includes (a) an arylene group or (b) an arylene group in combination with an alkylene, heteroalkylene, or both. Group IV can further include optional groups such as halo groups, oxy groups, thio groups, carbonyl groups, carbonyloxy groups, carbonylimino groups, phosphono groups, sulfono groups, nitro groups, nitrile groups, and the like. These epoxy resins can be prepared, for example, by reacting an aromatic compound having at least two hydroxyl groups with an excess of epichlorohydrin. Examples of useful aromatic compounds having at least two hydroxyl groups include, but are not limited to, resorcinol, catechol, hydroquinone, p,p'-dihydroxydibenzyl, p,p'-dihydroxyphenylsulfone, p,p'-dihydroxybenzophenone, 2,2'-dihydroxyphenyl sulfone, p,p'-dihydroxybenzophenone, and 9,9-(4-hydroxyphenol)fluorene. Still other examples include the 2,2', 2,3', 2,4', 3,3', 3,4', and 4,4' isomers of dihydroxydiphenylmethane, dihydroxydiphenyldimethylmethane, dihydroxydiphenyle thylme thylmethane, dihydroxydiphenylmethylpropylmethane, dihydroxydiphenylethylphenylmethane, dihydroxydiphenylpropylenphenylmethane, dihydroxydiphenylbutylphenylmethane, dihydroxydiphenyltolylethane, dihydroxydiphenyltolylmethylmethane, dihydroxydiphenyldicyclohexylmethane, and dihydroxydiphenylcyclohexane.

Some commercially available diglycidyl ether epoxy resins of Formula (I) are derived from bisphenol A (i.e., bisphenol A is 4,4'-dihydroxydiphenylmethane). Examples include, but are not limited to, those available under the trade designation EPON (e.g., EPON 1510, EPON 1310, EPON 828, EPON 872, EPON 1001, EPON 1004, and EPON 2004) from Momentive Specialty Chemicals, Inc. (Columbus, Ohio), those available under the trade designation DER (e.g., DER 331, DER 332, DER 336, and DER 439) from Olin Epoxy Co. (St. Louis, Mo.), and those available under the trade designation EPICLON (e.g., EPICLON 850) from Dainippon Ink and Chemicals, Inc. (Parsippany, N.J.). Other commercially available diglycidyl ether epoxy resins are derived from bisphenol F (i.e., bisphenol F is 2,2'-dihydroxydiphenylmethane). Examples include, but are not limited to, those available under the trade designation DER (e.g., DER 334) from Olin Epoxy Co. (St. Louis, Mo.), those available under the trade designation EPICLON (e.g., EPICLON 830) from Dainippon Ink and Chemicals, Inc. (Parsippany, N.J.), and those available under the trade designation ARALDITE (e.g., ARALDITE 281) from Huntsman Corporation (The Woodlands, Tex.).

Other epoxy resins of Formula (I) are diglycidyl ethers of a poly(alkylene oxide) diol. These epoxy resins also can be referred to as diglycidyl ethers of a poly(alkylene glycol) diol. The variable p is equal to 2 and R' is a heteroalkylene having oxygen heteroatoms. The poly(alkylene glycol) portion can be a copolymer or homopolymer and often includes alkylene units having 1 to 4 carbon atoms. Examples include, but are not limited to, diglycidyl ethers of poly (ethylene oxide) diol, diglycidyl ethers of poly(propylene oxide) diol, and diglycidyl ethers of poly(tetramethylene oxide) diol. Epoxy resins of this type are commercially available from Polysciences, Inc. (Warminster, Pa.) such as those derived from a poly(ethylene oxide) diol or from a poly(propylene oxide) diol having a weight average molecular weight of 400 grams/mole, 600 grams/mole, or 1000 grams/mole.

Still other epoxy resins of Formula (I) are diglycidyl ethers of an alkane diol (R' is an alkylene and the variable p is equal to 2). Examples include a diglycidyl ether of 1,4-dimethanol cyclohexyl, diglycidyl ether of 1,4-butanediol, and a diglycidyl ether of the cycloaliphatic diol formed from a hydrogenated bisphenol A such as those commercially available under the trade designation EPONEX (e.g., EPONEX 1510) from Hexion Specialty Chemicals, Inc. (Columbus, Ohio) and under the trade designation EPALLOY (e.g., EPALLOY 5001) from CVC Thermoset Specialties (Moorestown, N.J.).

For some applications, the epoxy resins chosen for use in the curable coating compositions are novolac epoxy resins, which are glycidyl ethers of phenolic novolac resins. These resins can be prepared, for example, by reaction of phenols with an excess of formaldehyde in the presence of an acidic catalyst to produce the phenolic novolac resin. Novolac epoxy resins are then prepared by reacting the phenolic novolac resin with epichlorihydrin in the presence of sodium hydroxide. The resulting novolac epoxy resins typically have more than two oxirane groups and can be used to produce cured coating compositions with a high crosslinking density. The use of novolac epoxy resins can be particularly desirable in applications where corrosion resistance, water resistance, chemical resistance, or a combination thereof is desired. One such novolac epoxy resin is poly[(phenyl glycidyl ether)-co-formaldehyde]. Other suitable novolac resins are commercially available under the trade designation ARALDITE (e.g., ARALDITE GY289, ARALDITE EPN 1183, ARALDITE EP 1179, ARALDITE EPN 1139, and ARALDITE EPN 1138) from Huntsman Corporation (The Woodlands, Tex.), under the trade designation EPALLOY (e.g., EPALLOY 8230) from CVC Thermoset Specialties (Moorestown, N.J.), and under the trade designation DEN (e.g., DEN 424 and DEN 431) from Olin Epoxy Co. (St. Louis, Mo.).

Yet other epoxy resins include silicone resins with at least two glycidyl groups and flame retardant epoxy resins with at least two glycidyl groups (e.g., a brominated bisphenol-type epoxy resin having at least two glycidyl groups such as that commercially available from Dow Chemical Co. (Midland, Mich.) under the trade designation DER 580).

The epoxy resin component is often a mixture of materials. For example, the epoxy resins can be selected to be a mixture that provides the desired viscosity or flow characteristics prior to curing. For example, within the epoxy resin may be reactive diluents that include monofunctional or certain multifunctional epoxy resins. The reactive diluent should have a viscosity which is lower than that of the epoxy resin having at least two epoxy groups. Ordinarily, the reactive diluent should have a viscosity less than 250 mPa·s (cPs). The reactive diluent tends to lower the viscosity of the epoxy/thiol resin composition and often has either a branched backbone that is saturated or a cyclic backbone that is saturated or unsaturated. Preferred reactive diluents have only one functional group (i.e., oxirane group) such as various monoglycidyl ethers. Some exemplary monofunctional epoxy resins include, but are not limited to, those with an alkyl group having 6 to 28 carbon atoms, such as (C6-C28)alkyl glycidyl ethers, (C6-C28)fatty acid glycidyl esters, (C6-C28)alkylphenol glycidyl ethers, and combinations thereof. In the event a monofunctional epoxy resin is the reactive diluent, such monofunctional epoxy resin should be employed in an amount of up to 50 parts based on the total of the epoxy resin component.

In some embodiments, the curable epoxy/thiol resin compositions typically include at least 20 weight percent (wt-%), at least 25 wt-%, at least 30 wt-%, at least 35 wt-%, at least 40 wt-%, or at least 45 wt-%, epoxy resin component, based on a total weight of the curable epoxy/thiol resin composition. If lower levels are used, the cured composition may not contain enough polymeric material (e.g., epoxy resin) to provide desired coating characteristics. In some embodiments, the curable epoxy/thiol resin compositions include up to 80 wt-%, up to 75 wt-%, or up to 70 wt-%, epoxy resin component, based on a total weight of the curable epoxy/thiol resin composition.

Thiol Component

A thiol is an organosulfur compound that contains a carbon-bonded sulfhydryl or mercapto (—C—SH) group. Suitable thiols are selected from a wide variety of compounds that have two or more thiol groups per molecule (i.e., polythiols), and that function as curatives for epoxy resins.

Examples of suitable polythiols include trimethylolpropane tris(beta-mercaptopropionate), trimethylolpropane tris(thioglycolate), pentaerythritol tetrakis(thioglycolate), pentaerythritol tetrakis(beta-mercaptopropionate), dipentaerythritol poly(beta-mercaptopropionate), ethylene glycol bis(beta-mercaptopropionate), a (C1-C12)alkyl polythiol (e.g., butane-1,4-dithiol and hexane-1,6-dithiol), a (C6-C12)aromatic polythiol (e.g., p-xylenedithiol and 1,3,5-tris(mercaptomethyl) benzene). Combinations of polythiols can be used if desired.

In some embodiments, the curable epoxy/thiol compositions typically include at least 25 wt-%, at least 30 wt-%, or at least 35 wt-%, thiol component, based on a total weight of the curable epoxy/thiol resin composition. In some embodiments, the curable epoxy/thiol compositions include up to 70 wt-%, up to 65 wt-%, up to 60 wt-%, up to 55 wt-%, up to 50 wt-%, up to 45 wt-%, or up to 40 wt-%, thiol component, based on a total weight of the curable epoxy/thiol resin composition. Various combinations of two or more polythiols can be used if desired.

In some embodiments, the ratio of the epoxy component to the thiol component in the curable epoxy/thiol resin compositions of the present disclosure is from 0.5:1 to 1.5:1, or 0.75:1 to 1.3:1 (epoxy:thiol equivalents).

Systems containing epoxy resins and polythiols suitable for use in the present disclosure are disclosed in U.S. Pat. No. 5,430,112 (Sakata et al.).

Nitrogen-Containing Catalyst

The nitrogen-containing catalysts are typically of the heat activated class. In certain embodiments, the nitrogen-containing catalysts are capable of activation at temperatures at or above 50° C. to effect the thermal curing of a thermoset polymer (e.g., an epoxy resin).

As used herein, the term "nitrogen-containing catalyst" refers to any nitrogen-containing compound that catalyzes the curing of the epoxy resin. The term does not imply or suggest a certain mechanism or reaction for curing. The nitrogen-containing catalyst can directly react with the oxirane ring of the epoxy resin, can catalyze or accelerate the reaction of the polythiol compound with the epoxy resin, or can catalyze or accelerate the self-polymerization of the epoxy resin.

In certain embodiments, the nitrogen-containing catalysts are amine-containing catalysts. Some amine-containing catalysts have at least two groups of formula —NR$^2$H, wherein R$^2$ is selected from hydrogen, alkyl, aryl, alkaryl, or aralkyl. Suitable alkyl groups often have 1 to 12 carbon atoms, 1 to 8 carbon atoms, 1 to 6 carbon atoms, or 1 to 4 carbon atoms. The alkyl group can be cyclic, branched, linear, or a combination thereof. Suitable aryl groups usually have 6 to 12 carbon atom such as a phenyl or biphenyl group. Suitable alkylaryl groups can include the same aryl and alkyl groups discussed above.

The nitrogen-containing catalyst minus the at least two amino groups (i.e., the portion of the catalyst that is not an amino group) can be any suitable aromatic group, aliphatic group, or combination thereof.

Exemplary nitrogen-containing catalysts for use herein include a reaction product of phthalic anhydride and an aliphatic polyamine, more particularly a reaction product of approximately equimolar proportions of phthalic acid and diethylamine triamine, as described in British Patent 1,121,196 (Ciba Geigy AG). A catalyst of this type is available commercially from Ciba Geigy AG under the tradename CIBA HT 9506.

Yet another type of nitrogen-containing catalyst is a reaction product of: (i) a polyfunctional epoxy compound; (ii) an imidazole compound, such as 2-ethyl-4-methylimidazole; and (iii) phthalic anhydride. The polyfunctional epoxy compound may be a compound having two or more epoxy groups in the molecule as described in U.S. Pat. No. 4,546,155 (Hirose et al.). A catalyst of this type is commercially available from Ajinomoto Co. Inc. (Tokyo, Japan) under the tradename AJICURE PN-23, which is believed to be an adduct of EPON 828 (bisphenol type epoxy resin epoxy equivalent 184-194, commercially available from Hexion Specialty Chemicals, Inc. (Columbus, Ohio)), 2-ethyl-4-methylimidazole, and phthalic anhydride.

Other suitable nitrogen-containing catalysts include the reaction product of a compound having one or more isocyanate groups in its molecule with a compound having at least one primary or secondary amino group in its molecule. Additional nitrogen-containing catalysts include 2-heptadeoylimidazole, 2-phenyl-4,5-dihydroxymethylimidazole, 2-phenyl-4-methyl-5-hydroxymethylimidazole, 2-phenyl-4-benzyl-5-hydroxymethylimidazole, 2,4-diamino-8-2-methylimidazolyl-(1)-ethyl-5-triazine, or a combination thereof, as well as products of triazine with isocyanuric acid, succinohydrazide, adipohydrazide, isophtholohydrazide, o-oxybenzohydrazide, salicylohydrazide, or a combination thereof.

Nitrogen-containing catalysts are commercially available from sources such as Ajinomoto Co. Inc. (Tokyo, Japan) under the tradenames AMICURE MY-24, AMICURE GG-216 and AMICURE ATU CARBAMATE, from Hexion Specialty Chemicals, Inc. (Columbus, Ohio) under the tradename EPIKURE P-101, from T&K Toka (Chikumazawa, Miyoshi-Machi, Iruma-Gun, Saitama, Japan) under the tradenames FXR-1020, FXR-1081, and FXR-1121, from Shikoku (Marugame, Kagawa Prefecture, Japan) under the tradenames CUREDUCT P-2070 and P-2080, from Air Products and Chemicals (Allentown, Pa.) under the tradenames ANCAMINE 2441 and 2442, from AC Catalysts (Linden, N.J.) under the tradenames TECHNICURE LC80 and LC100), and from Asahi Kasei Kogyo, K.K. (Japan) under the tradename NOVACURE HX-372.

Other suitable nitrogen-containing catalysts are those described in U.S. Pat. No. 5,077,376 (Dooley et al.) and U.S. Pat. No. 5,430,112 (Sakata et al.) referred to as "amine adduct latent accelerators." Other exemplary nitrogen-containing catalysts are described, for example, in British Patent 1,121,196 (Ciba Geigy AG), European Patent Application No. 138465A (Ajinomoto Co.), and European Patent Application No. 193068A (Asahi Chemical).

Various combinations of two or more nitrogen-containing catalysts can be used if desired.

Metal Nanoparticles

The curable, one-part epoxy/thiol resin composition comprises metal nanoparticles dispersed in the curable composition. In most embodiments, the metal nanoparticles comprise at least one of silver nanoparticles or copper nanoparticles. Typically, the metal nanoparticles are combined with the nitrogen-containing catalyst (and optionally other filler(s)) and the thiol component prior to adding the metal nanoparticles to the epoxy resin mixture. This allows for association of the nitrogen-containing catalyst with the metal nanoparticles and to a certain extent the thiol function before having an opportunity to react with the epoxy resin (or any other thermoset polymer) and cause undesirable curing of the epoxy/thiol resin composition. For instance, the epoxy/thiol resin composition will contain much more thiol than metal nanoparticles, thus only a fraction of the thiol component will have an opportunity to associate with metal nanoparticles. It is believed that the affinity of nitrogen-containing materials (e.g., amines) and thiol materials for metals such as silver and copper is unexpectedly sufficiently strong to slow the reaction of a nitrogen-containing catalyst and to a certain extent thiols with the epoxy resin (or any other thermoset polymer) to extend the shelf life of the epoxy/thiol resin composition by at least a few days (as compared to the same composition without the metal nanoparticles). Moreover, it is believed that the affinity of thiols with metals such as silver and copper assists in slowing undesirable curing of the epoxy/thiol resin composition prior to exposing the epoxy/thiol resin composition to temperatures of 50° C. or greater.

In certain embodiments, the metal nanoparticles (e.g., the silver nanoparticles and/or copper nanoparticles) are present in the curable composition in an amount of at least 1 wt-%, at least 2 wt-%, at least 3 wt-%, at least 4 wt-%, or at least 5 wt-%, based on the total weight of the curable composition; and up to 10 wt-%, up to 9 wt-%, up to 8 wt-%, up to 7 wt-%, or up to 6 wt-%, based on the total weight of the curable composition. Stated a different way, in certain embodiments, the metal nanoparticles (e.g., the silver nanoparticles and/or copper nanoparticles) are present in the curable composition in an amount of between 1 wt-% and 10 wt-%, between 1 wt-% and 8 wt-%, or between 2 wt-% and 6 wt-%, based on the total weight of the curable composition. Including less than about 1 wt-% of the metal nanoparticles may not provide sufficient surface area for the nitrogen-containing catalyst and thiols to associate with to minimize early curing of the epoxy/thiol resin composition. Including more than about 10 wt-% of the metal nanoparticles adds further cost and weight to the epoxy/thiol resin composition and risks increasing the viscosity of the system.

The size of the metal nanoparticles (e.g., the silver nanoparticles, copper nanoparticles, or both) is not particularly limited. In certain embodiments, the metal nanoparticles comprise an average diameter of less than 1 micrometer, 800 nanometers or less, 600 nanometers or less, 500 nanometers or less, 400 nanometers or less, 300 nanometers or less, 200 nanometers or less, or 100 nanometers or less; and an average diameter of 1 nanometer or more, 2 nanometers or more, 5 nanometers or more, 7 nanometers or more, 10 nanometers or more, 20 nanometers or more, 30 nanometers or more, 40 nanometers or more, or 50 nanometers or more. In select embodiments, the metal nanoparticles (e.g., the silver nanoparticles, copper nanoparticles, or both) comprise an average diameter of 20 nanometers.

The metal nanoparticles may be essentially pure silver (e.g., 99% or greater silver metal), an alloy of silver, essentially pure copper (e.g., 99% or greater copper metal), an alloy of copper, essentially pure gold (e.g., 99% or greater gold metal), an alloy of gold, essentially pure platinum (e.g., 99% or greater platinum metal), an alloy of platinum, or combinations thereof. Exemplary suitable metal nanoparticles include for instance and without limitation, powders of silver nanoparticles or copper nanoparticles commercially available from US Research Nanomaterials, Inc. (Houston, Tex.).

Optional Additives in the Curable Composition

In addition to the epoxy resin component, the thiol component, and the particles, the curable composition can include various optional additives. One such optional additive is a toughening agent. Toughening agents can be added to provide the desired overlap shear, peel resistance, and impact strength. Useful toughening agents are polymeric materials that may react with the epoxy resin and that may be cross-linked. Suitable toughening agents include polymeric compounds having both a rubbery phase and a thermoplastic phase or compounds which are capable of forming, with the epoxide resin, both a rubbery phase and a thermoplastic phase on curing. Polymers useful as toughening agents are preferably selected to inhibit cracking of the cured epoxy composition.

Some polymeric toughening agents that have both a rubbery phase and a thermoplastic phase are acrylic core-shell polymers wherein the core is an acrylic copolymer having a glass transition temperature below 0° C. Such core polymers may include polybutyl acrylate, polyisooctyl acrylate, polybutadiene-polystyrene in a shell comprised of an acrylic polymer having a glass transition temperature above 25° C., such as polymethylmethacrylate. Commercially available core-shell polymers include those available as a dry powder under the trade designations ACRYLOID KM 323, ACRYLOID KM 330, and PARALOID BTA 731, from Dow Chemical Co., and KANE ACE B-564 from Kaneka Corporation (Osaka, Japan). These core-shell polymers may also be available as a predispersed blend with a diglycidyl ether of bisphenol A at, for example, a ratio of 12 to 37 parts by weight of the core-shell polymer and are available under the trade designations KANE ACE (e.g., KANE ACE MX 157, KANE ACE MX 257, and KANE ACE MX 125) from Kaneka Corporation (Japan).

Another class of polymeric toughening agents that are capable of forming, with the epoxide group-containing material, a rubbery phase on curing, are carboxyl-terminated butadiene acrylonitrile compounds. Commercially available carboxyl-terminated butadiene acrylonitrile compounds include those available under the trade designations HYCAR (e.g., HYCAR 1300X8, HYCAR 1300X13, and HYCAR 1300X17) from Lubrizol Advanced Materials, Inc. (Cleveland, Ohio) and under the trade designation PARALOID (e.g., PARALOID EXL-2650) from Dow Chemical (Midland, Mich.).

Other polymeric toughening agents are graft polymers, which have both a rubbery phase and a thermoplastic phase, such as those disclosed in U.S. Pat. No. 3,496,250 (Czerwinski). These graft polymers have a rubbery backbone having grafted thereto thermoplastic polymer segments. Examples of such graft polymers include, for example, (meth)acrylate-butadiene-styrene, and acrylonitrile/butadiene-styrene polymers. The rubbery backbone is preferably prepared so as to constitute from 95 wt-% to 40 wt-% of the total graft polymer, so that the polymerized thermoplastic portion constitutes from 5 wt-% to 60 wt-% of the graft polymer.

Still other polymeric toughening agents are polyether sulfones such as those commercially available from BASF (Florham Park, N.J.) under the trade designation ULTRASON (e.g., ULTRASON E 2020 P SR MICRO).

The curable composition can additionally contain a non-reactive plasticizer to modify rheological properties. Commercially available plasticizers include those available under the trade designation BENZOFLEX 131 from Eastman Chemical (Kingsport, Tenn.), JAYFLEX DINA available from ExxonMobil Chemical (Houston, Tex.), and PLASTOMOLL (e.g., diisononyl adipate) from BASF (Florham Park, N.J.).

The curable composition optionally contains a flow control agent or thickener, to provide the desired rheological characteristics to the composition. Suitable flow control agents include fumed silica, such as treated fumed silica, available under the trade designation CAB-O-SIL TS 720, and untreated fumed silica available under the trade designation CAB-O-SIL M5, from Cabot Corp. (Alpharetta, Ga.).

In some embodiments, the curable composition optimally contains adhesion promoters to enhance the bond to the substrate. The specific type of adhesion promoter may vary depending upon the composition of the surface to which it will be adhered. Adhesion promoters that have been found to be particularly useful for surfaces coated with ionic type lubricants used to facilitate the drawing of metal stock during processing include, for example, dihydric phenolic compounds such as catechol and thiodiphenol.

The curable composition optionally may also contain one or more conventional additives such as fillers (e.g., aluminum powder, carbon black, glass bubbles, talc, clay, calcium carbonate, barium sulfate, titanium dioxide, silica such as fused silica, silicates, glass beads, and mica), pigments, flexibilizers, reactive diluents, non-reactive diluents, fire retardants, antistatic materials, thermally conductive particles, and expanding agents including, for example, chemical blowing agents such as azodicarbonamide or expandable polymeric microspheres containing a hydrocarbon liquid, such as those sold under the trade designation EXPANCEL by Expancel Inc. (Duluth, Ga.). Particulate fillers can be in the form of flakes, rods, spheres, and the like. Additives are typically added in amounts to produce the desired effect in the resulting adhesive.

The amount and type of such additives may be selected by one skilled in the art, depending on the intended end use of the composition.

Preparation and Use of Curable Composition

The metal nanoparticles are first mixed with the thiol component, the nitrogen-containing catalyst, and then mixed with the epoxy resin component and one or more optional additives (e.g., nonionic surfactant). While any suitable amount of the metal nanoparticles can be combined with the epoxy/thiol resin mixture, the amount is typically dependent on the amount and type of nitrogen-based catalyst in the catalyst-containing particle. In many embodiments, the amount of nitrogen-containing catalyst included in the composition is at least 0.1 wt-%, based on the total weight of the curable composition. If lower amounts are used, there may be an insufficient amount of the nitrogen-containing catalyst to polymerize the epoxy resin. The amount of the nitrogen-containing catalyst can be, for example, at least 0.5 wt-%, at least 1 wt-%, at least 1.5 wt-%, at least 2 wt-%, or at least 2.5 wt-%, based on the total weight of the curable composition. The amount of the nitrogen-containing catalyst can be up to 5 wt-%, based on the total weight of the curable composition. If the amount of the nitrogen-containing catalyst is higher, the final cured composition may be too soft (it may have lower than the desired amount of strength integrity). The amount of the nitrogen-containing catalyst can be, for example, up to 4.5 wt-%, up to 4 wt-%, up to 3.5 wt-%, or up to 3 wt-%. In some example embodiments, the amount is in a range of 0.1 to 5 wt-%, in a range of 0.5 to 5 wt-%, in a range of 1 to 5 wt-%, in a range of 0.5 to 4 wt-%, in a range of 0.5 to 3 wt-%, in a range of 0.5 to 2 wt-%, in a range of 1 to 4 wt-%, in a range of 1 to 3 wt-%, or in a range of 1 to 2 wt-%.

In many embodiments, the curable composition is positioned between two substrates and then heated to cause separation of the nitrogen-containing catalyst from the metal nanoparticle. Upon disassociation from the metal nanoparticle, the nitrogen-containing catalyst contacts the epoxy resin in the curable composition. If the conditions are suitable for reaction, the nitrogen-containing catalyst can react with the epoxy resin resulting in the formation of a cured composition. Conditions suitable for reaction include, for example, having a sufficient concentration of nitrogen-containing catalyst mixed with the epoxy resin and having a sufficient temperature for curing the epoxy resin. In certain embodiments, the curable epoxy/thiol resin composition is cured comprising heating the composition to a temperature of up to 90° C. In certain embodiments, the curable epoxy/thiol composition is cured comprising heating the composition to a temperature of 60-65° C.

Typically, the curable (and the cured), one-part epoxy/thiol resin composition is substantially electrically nonconductive. For instance, in certain embodiments each of the curable and the cured one-part epoxy/thiol resin composition exhibits an electrical conductivity of no more than $10^{-15}$ Siemens per meter. It is believed that the submicron size of the metal particles inhibits electrical conductivity of the one-part epoxy/thiol resin composition (at least at the loadings of 0.1 wt-% to 10 wt-% of the total composition) because the particles are too small to provide a sufficiently continuous electrically conductive conduit through the epoxy/thiol resin composition. Notably, use of silver microparticles was not found to be effective to extend the shelf life of a curable, one-part epoxy/thiol resin composition (see, e.g., Comparative Example 5 below).

Substrates can be selected from various materials depending on the application. Materials useful for substrates include, but are not limited to, metals, ceramics, glasses, composite materials, polymeric materials, and the like. Metals useful as substrates include, but are not limited to, aluminum and steel, such as high strength steel, stainless steel, galvanized steel, cold-rolled steel, and surface-treated metals. Surface treatments include, but are not limited to, paints, oil draw lubricants or stamping lubricants, electrocoats, powder coats, primers, chemical and physical surface treatments, and the like. Composites useful as substrates in the present disclosure include, but are not limited to, glass reinforced composites and carbon reinforced composites. Polymeric materials useful as substrates in the present disclosure include, but are not limited to, nylon, polycarbonate, polyester, (meth)acrylate polymers and copolymers, acrylonitrile-butadiene-styrene copolymers, and the like.

In a further aspect, a method of curing a curable, one-part epoxy/thiol resin composition is provided. The method comprises: providing a curable, one-part epoxy/thiol resin composition of any embodiment according to the first aspect; and heating the curable, one-part epoxy/thiol resin composition to a temperature of at least 50° C. For instance, the curable compositions are the same as described above and an epoxy/thiol resin mixture including an epoxy resin, a thiol component, and a nitrogen-containing catalyst for the epoxy resin. The epoxy/thiol resin mixture further includes metal nanoparticles (e.g., silver nanoparticles, copper nanoparticles, or both), dispersed in the epoxy/thiol resin mixture. In an additional aspect, a cured epoxy/thiol resin composition is provided. The cured epoxy/thiol resin composition is prepared by a method of any of the embodiments described above with respect to the curable compositions.

The affinity of the nitrogen-containing catalyst for the metal nanoparticles (e.g., silver and/or copper nanoparticles) allows for the preparation of a one part curable composition. That is, all of the components of the curable composition can be mixed together and then heated for reactivity (i.e., formation of the cured compositions). The curable composition can be stored for at least 3 days, at least 5 days, at least 1 week, at least 2 weeks, at least 4 weeks, or more, prior to formation of the cured composition. The time of curing often can be selected by controlling the temperature in which the curable composition is stored.

EXEMPLARY EMBODIMENTS

Various embodiments are provided that include a one-part epoxy/thiol resin composition and a method of curing a one-part epoxy/thiol composition.

Embodiment 1 is a curable, one-part epoxy/thiol composition. The composition comprises an epoxy/thiol resin mixture including: an epoxy resin component including an epoxy resin having at least two epoxide groups per molecule; a thiol component including a polythiol compound having at least two primary thiol groups; and a nitrogen-containing catalyst for the epoxy resin. The composition further includes metal nanoparticles (e.g., silver nanoparticles, copper nanoparticles, or both), dispersed in the epoxy/thiol resin mixture.

Embodiment 2 is the curable, one-part epoxy/thiol resin composition of embodiment 1 which is curable at a temperature of at least 50° C.

Embodiment 3 is the curable, one-part epoxy/thiol resin composition of embodiment 1 or embodiment 2 which is curable at a temperature of up to 90° C.

Embodiment 4 is the curable, one-part epoxy/thiol resin composition of any of the preceding embodiments wherein the epoxy resin includes a polyglycidyl ether of a polyhydric phenol, a reaction product of a polyhydric alcohol with epichlorohydrin, an epoxidised (poly)olefinic resin, an epoxidised phenolic novolac resin, an epoxidised cresol novolac resin, a cycloaliphatic epoxy resin, a glycidyl ether ester, a polyglycidyl ester, a urethane modified epoxy resin, or a combination of two or more thereof.

Embodiment 5 is the curable, one-part epoxy/thiol resin composition of any of the preceding embodiments wherein the epoxy component further includes a reactive diluent.

Embodiment 6 is the curable, one-part epoxy/thiol resin composition of embodiment 5 wherein the reactive diluent has a viscosity of less than 250 mPa·s (cPs).

Embodiment 7 is the curable, one-part epoxy/thiol resin composition of embodiment 5 or embodiment 6 wherein the reactive diluent is a monofunctional epoxy resin.

Embodiment 8 is the curable, one-part epoxy/thiol resin composition of embodiment 7 wherein the monofunctional epoxy resin includes a (C6-C28)alkyl group.

Embodiment 9 is the curable, one-part epoxy/thiol resin composition of embodiment 8 wherein the monofunctional epoxy resin includes (C6-C28)alkyl glycidyl ethers, (C6-C28)fatty acid glycidyl esters, (C6-C28)alkylphenol glycidyl ethers, or combinations thereof. Embodiment 10 is the curable, one-part epoxy/thiol resin composition of any of the preceding embodiments wherein the epoxy resin component is present in an amount of at least 20 wt-%, at least 25 wt-%, at least 30 wt-%, at least 35 wt-%, at least 40 wt-%, or at least 45 wt-%, based on the total weight of the curable epoxy/thiol resin composition.

Embodiment 11 is the curable, one-part epoxy/thiol resin composition of any of the preceding embodiments wherein the epoxy resin component is present in an amount of up to 80 wt-%, up to 75 wt-%, or up to 70 wt-%, based on the total weight of the curable epoxy/thiol resin composition.

Embodiment 12 is the curable, one-part epoxy/thiol resin composition of any of the preceding embodiments wherein the polythiol compound includes trimethylolpropane tris (beta-mercaptopropionate), trimethylolpropane tris(thioglycolate), pentaerythritol tetrakis(thioglycolate), pentaerythritol tetrakis(beta-mercaptopropionate), dipentaerythritol poly (beta-mercaptopropionate), ethylene glycol bis(beta-mercaptopropionate), a (C1-C12)alkyl polythiol, a (C6-C12) aromatic polythiol, or a combination of two or more thereof.

Embodiment 13 is the curable, one-part epoxy/thiol resin composition of any of the preceding embodiments wherein the thiol component is present in an amount of at least 25 wt-%, at least 30 wt-%, or at least 35 wt-%, thiol component, based on a total weight of the curable epoxy/thiol resin composition.

Embodiment 14 is the curable, one-part epoxy/thiol resin composition of any of the preceding embodiments wherein the thiol component is present in an amount of up to 70 wt-%, up to 65 wt-%, up to 60 wt-%, up to 55 wt-%, up to 50 wt-%, up to 45 wt-%, or up to 40 wt-%, thiol component, based on a total weight of the curable epoxy/thiol resin composition.

Embodiment 15 is the curable, one-part epoxy/thiol resin composition of any of the preceding embodiments wherein the epoxy resin component and the thiol component are present in a ratio of from 0.5:1 to 1.5:1, or 0.75:1 to 1.3:1 (epoxy:thiol equivalents).

Embodiment 16 is the curable, one-part epoxy/thiol resin composition of any of the preceding embodiments wherein the nitrogen-containing catalyst is capable of activation at temperatures at or above 50° C. to effect the thermal curing of the epoxy resin.

Embodiment 17 is the curable, one-part epoxy/thiol resin composition of any of the preceding embodiments wherein the nitrogen-containing catalyst is an amine-containing catalyst.

Embodiment 18 is the curable, one-part epoxy/thiol resin composition of embodiment 17 wherein the amine-containing catalyst has at least two groups of formula —NR$^2$H, wherein R$^2$ is selected from hydrogen, alkyl, aryl, alkaryl, or aralkyl.

Embodiment 19 is the curable, one-part epoxy/thiol resin composition of embodiment 18 wherein the amine-containing catalyst includes a reaction product of phthalic anhydride and an aliphatic polyamine.

Embodiment 20 is the curable, one-part epoxy/thiol resin composition of embodiment 18 wherein the amine-containing catalyst includes a reaction product of: (i) a polyfunctional epoxy compound; (ii) an imidazole compound, such as 2-ethyl-4-methylimidazole; and (iii) phthalic anhydride.

Embodiment 21 is the curable, one-part epoxy/thiol resin composition of embodiment 18 wherein the amine-containing catalyst includes a reaction product of a compound having one or more isocyanate groups in its molecule with a compound having at least one primary or secondary amino group in its molecule.

Embodiment 22 is the curable, one-part epoxy/thiol resin composition of embodiment 18 wherein the amine-containing catalyst includes 2-heptadeoylimidazole, 2-phenyl-4,5- dihydroxymethylimidazole, 2-phenyl-4-methyl-5-hydroxymethylimidazole, 2-phenyl-4-benzyl-5-hydroxymethylimidazole, 2,4-diamino-8-2-methylimidazolyl-(1)-ethyl-5-triazine, or a combination thereof.

Embodiment 23 is the curable, one-part epoxy/thiol resin composition of embodiment 18 wherein the amine-containing catalyst includes products of triazine with isocyanuric acid, succinohydrazide, adipohydrazide, isophtholohydrazide, o-oxybenzohydrazide, salicylohydrazide, or a combination thereof.

Embodiment 24 is the curable, one-part epoxy/thiol resin composition of any of the preceding embodiments wherein the silver nanoparticles, copper nanoparticles, or both are present in the curable composition in an amount of at least 1 wt-%, based on the total weight of the curable composition.

Embodiment 25 is the curable, one-part epoxy/thiol resin composition of any of the preceding embodiments wherein the silver nanoparticles, copper nanoparticles, or both are present in the curable composition in an amount of up to 10 wt-%, based on the total weight of the curable composition.

Embodiment 26 is the curable, one-part epoxy/thiol resin composition of any of the preceding embodiments wherein the nitrogen-containing catalyst is present in the curable composition in an amount of at least 1 wt-%, based on the total weight of the curable composition.

Embodiment 27 is the curable, one-part epoxy/thiol resin composition of any of the preceding embodiments wherein the nitrogen-containing catalyst is present in the curable composition in an amount of up to 5 wt-%, based on the total weight of the curable composition.

Embodiment 28 is the curable, one-part epoxy/thiol resin composition of any of the preceding embodiments wherein the composition exhibits an electrical conductivity of no more than $10^{-15}$ Siemens per meter.

Embodiment 29 is the curable, one-part epoxy/thiol resin composition of any of the preceding embodiments wherein the silver nanoparticles, copper nanoparticles, or both have an average diameter of 500 nanometers or less.

Embodiment 30 is the curable, one-part epoxy/thiol resin composition of any of the preceding embodiments wherein the silver nanoparticles, copper nanoparticles, or both have an average diameter of 100 nanometers or less.

Embodiment 31 is the curable, one-part epoxy/thiol resin composition of any of the preceding embodiments wherein the silver nanoparticles, copper nanoparticles, or both have an average diameter of 1 nanometer or more.

Embodiment 32 is the curable, one-part epoxy/thiol resin composition of any of the preceding embodiments wherein the silver nanoparticles, copper nanoparticles, or both have an average diameter of 20 nanometers.

Embodiment 33 is the curable, one-part epoxy/thiol resin composition of any of the preceding embodiments wherein the metal nanoparticles include gold nanoparticles, platinum nanoparticles, or both.

Embodiment 34 is a method of curing a curable, one-part epoxy/thiol resin composition comprising: providing a curable, one-part epoxy/thiol resin composition of any of embodiments 1 through 33; and heating the curable, one-part epoxy/thiol resin composition to a temperature of at least 50° C.

Embodiment 35 is a method of curing a curable, one-part epoxy/thiol resin composition comprising: providing a curable, one-part epoxy/thiol resin composition including: an epoxy resin component including an epoxy resin having at least two epoxide groups per molecule; a thiol component including a polythiol compound having at least two primary thiol groups; a nitrogen-containing catalyst for the epoxy resin; and metal nanoparticles (e.g., silver nanoparticles, copper nanoparticles, or both), dispersed in the epoxy/thiol resin mixture; and heating the curable, one-part epoxy/thiol resin composition to a temperature of at least 50° C.

Embodiment 36 is the method of embodiment 35 including heating the curable, one-part epoxy/thiol resin composition to a temperature of up to 90° C.

Embodiment 37 is the method of embodiment 36 including heating the curable, one-part epoxy/thiol resin composition to a temperature of 60-65° C.

Embodiment 38 is a cured epoxy/thiol resin composition prepared by a method of any of embodiments 34 through 36.

EXAMPLES

Summary of Materials

The materials with their sources were as listed in Table 1. Unless otherwise indicated, all materials were purchased from commercial sources and used as received.

TABLE 1

Materials List

| Designation | Description |
| --- | --- |
| CA-1 | Curing agent available under the trade name ANCAMINE 2442 from Air Products and Chemical, Inc., Allentown, PA, USA. |
| CA-2 | Curing agent available under the trade name AJICURE PN-23 from ACCI Specialty Materials, Linden, NJ, USA. |
| ER828 | Epoxy resin comprising the diglycidylether of bisphenol A available under the trade name EPON RESIN 828 from Momentive Specialty Chemicals, Inc., Columbus, OH, USA. |
| TMPMP | Trimethylolpropane tri(3-mercaptopropionate) available under the trade name THIOCURE TMPMP from Evans Chemetics, Teaneck, NJ, USA. |
| $CaCO_3$ | Calcium carbonate available under the trade name OMYACARB 5-FL from Omya, Inc., Cincinnati, OH, USA. |
| Fumed silica | Pyrogenic silica available under the trade name HDK H18 from Wacker Chemie AG, Munich, Germany. |
| Silver nanopowder | Silver nanoparticles (Ag, 99.9%, 20 nm, stabilized with 0.2% polyvinylpyrrolidone) available from US Research Nanomaterials, Inc., Houston, TX, USA. |
| Copper nanopowder | Copper nanoparticles (Cu, 99.9%, 40 nm, stabilized with 1%% polyvinylpyrrolidone) available from US Research Nanomaterials, Inc., Houston, TX, USA. |
| Silver micropowder | Silver powder (5.0-8.0 micron) available from Alfa Products, Inc., Danvers, MA, USA. |

Test Methods

Differential Scanning Calorimetry (DSC)

Differential scanning calorimetry (DSC) was performed on a Q2000 model differential scanning calorimeter (TA Instruments Inc., New Castle, Del., USA). DSC samples were typically 6 to 20 milligrams. Testing was done in sealed, aluminum, T-zero sample pans (TA Instruments, Inc., New Castle, Del., USA) and ramped through a heat cycle between room temperature (25° C.) and 300° C. at a rate of 10° C./minute. The data from the reaction process was graphed on a chart showing heat flow versus temperature. The integrated area under an exothermic peak represents the total exotherm energy produced during the reaction and is measured in Joules/gram (J/g); the exotherm energy is proportional to extent of cure (that is, degree of polymerization). The exotherm profile (that is, the onset temperature (the temperature at which reaction will begin to occur), the peak temperature, and the end temperature) provides information on conditions needed to cure the sample. For the measurement of curing time at 90° C., a 60 minute isothermal program was started by jumping the temperature to 90° C. The data from the reaction process was graphed on a chart showing heat flow versus time. The curing time was represented as the end of peak when the heat flow was overlapped with baseline.

Shelf-Life Test

Curable samples were placed at room temperature under ambient conditions. The viscosity of the compositions was monitored until the mixture could not be stirred by hand.

Rheology

Viscosity of the fully formulated samples was run by shear rate sweeping using an ARES-G2 rheometer (TA Instruments, Inc., New Castle, Del.) at 25° C. using a 25 millimeter (mm) diameter stainless steel cone with a cone angle of 0.09896 radians (rad) and a 50 mm plate. The initial shear rate was 20 1/seconds ($s^{-1}$) and the final rate was 0.2 $s^{-1}$. Twenty points of data were recorded. For the purpose of monitoring change in viscosity over time, the measured viscosity with a shear rate of 4.1 $s^{-1}$ was used.

Examples 1-12 (E—1-12) and Comparative Examples 1-5 (CE—1-5): One-Part Epoxy/Thiol Resin Composition For each Example 1-12, the respective amounts of silver or copper nanopowder, TMPMP, and the appropriate latent catalyst (e.g., CA-1 (curing agent available under the trade name ANCAMINE 2442 from Air Products and Chemical, Inc., Allentown, Pa.) or CA-2 (curing agent available under the trade name AJICURE PN-23 from ACCI Specialty Materials, Linden, N.J.)) were combined in MAX 300 cups (Flacktek Inc., Landrum, S.C., USA) and fully mixed using a DAC 150.1 FV Speedmixer (FlackTek Inc., Landrum, S.C., USA) for 1 minute at 2000 revolutions per minute (rpm). After cooling to room temperature for 1 minute, ER828 (epoxy resin comprising the diglycidylether of bisphenol A available under the trade name EPON RESIN 828 from Momentive Specialty Chemicals, Inc., Columbus, Ohio), $CaCO_3$, and fumed silica were added to the mixture, as listed in Table 1, and further mixed using a DAC 150.1 FV Speedmixer (FlackTek Inc., Landrum, S.C.) for 30 seconds at 1000 rpm. After formulation, all samples were stored at room temperature for testing and shelf life evaluation.

For each Comparative Example 1-5, the respective amounts of silver micropowder, TMPMP, and latent catalyst (e.g., CA-1 or CA-2) were combined in MAX 300 cups (Flacktek Inc., Landrum, S.C., USA) and fully mixed using a DAC 150.1 FV Speedmixer (FlackTek Inc., Landrum, S.C., USA) for 1 minute at 2000 rpm. After cooling to room temperature for 1 minute, ER828, $CaCO_3$, and fumed silica were added to the mixture, according to Table 2, and further mixed using a DAC 150.1 FV Speedmixer (FlackTek Inc., Landrum, S.C., USA) for 30 seconds at 1000 rpm. After formulation, all samples were stored at room temperature for testing and shelf life evaluation.

Tables 3 and 5 show the effect of catalyst loading (1, 3, and 5 wt. %) when the amount of silver or copper nanoparticles is kept constant (2 wt. %). Table 4 shows the effect of silver particle loading (2, 5, and 8 wt. %) when the amount of CA-1 or CA-2 catalyst is kept constant (5 wt. %).

TABLE 1

Formulation Information of Examples with Silver or Copper Nanopowders

| | E-1 | E-2 | E-3 | E-4 | E-5 | E-6 | E-9 | E-10 | E-11 | E-12 |
|---|---|---|---|---|---|---|---|---|---|---|
| Silver nanopowder (20 nm) | 0.2 | 0.2 | 0.2 | — | — | — | 0.5 | 0.8 | 0.5 | 0.8 |
| Copper nanopowder (40 nm) | — | — | — | 0.2 | 0.2 | 0.2 | — | — | — | — |
| TMPMP | 2.4 | 2.4 | 2.4 | 2.4 | 2.4 | 2.4 | 2.4 | 2.4 | 2.4 | 2.4 |
| ER828 | 3.1 | 3.1 | 3.1 | 3.1 | 3.1 | 3.1 | 3.1 | 3.1 | 3.1 | 3.1 |
| $CaCO_3$ | 3.4 | 3.4 | 3.4 | 3.4 | 3.4 | 3.4 | 3.4 | 3.4 | 3.4 | 3.4 |
| Fumed silica | 0.18 | 0.18 | 0.18 | 0.18 | 0.18 | 0.18 | 0.18 | 0.18 | 0.18 | 0.18 |
| CA-1 | 0.11 | 0.32 | 0.53 | 0.11 | 0.32 | 0.53 | 0.53 | 0.53 | | |
| CA-2 | — | — | — | — | — | — | — | — | 0.53 | 0.53 |

TABLE 2

Formulation Information of Comparative Examples

| | CE-1 | CE-2 | CE-3 | CE-4 | CE-5 |
|---|---|---|---|---|---|
| Silver nanopowder (20 nm) | — | — | — | — | — |
| Copper nanopowder (40 nm) | — | — | — | — | — |
| Silver micropowder (5.0-8.0 micron) | — | — | — | — | 0.5 |
| TMPMP | 2.4 | 2.4 | 2.4 | 2.4 | 2.4 |
| ER828 | 3.1 | 3.1 | 3.1 | 3.1 | 3.1 |
| $CaCO_3$ | 3.4 | 3.4 | 3.4 | 3.4 | 3.4 |
| Fumed silica | 0.18 | 0.18 | 0.18 | 0.18 | 0.18 |
| CA-1 | 0.11 | 0.32 | 0.53 | — | 0.53 |
| CA-2 | — | — | — | 0.53 | — |

TABLE 3

Initial Cure Properties with Silver Nanopowders (20 nm)

| | E-1 | CE-1 | E-2 | CE-2 | E-3 | CE-3 |
|---|---|---|---|---|---|---|
| Onset Temp (° C.) | 85.97 | 76.30 | 75.12 | 71.26 | 70.16 | 72.23 |
| Peak Temp (° C.) | 97.96 | 89.95 | 84.72 | 81.89 | 79.32 | 81.64 |
| Delta H (J/g) | 216.0 | 219.6 | 320.5 | 196.2 | 178.6 | 308.7 |
| Cure time at 90° C. (min) | 6.5 | 4.5 | 3.2 | 3.2 | 2.5 | 2.0 |
| Cure time at 70° C. (min) | 14.4 | 11.4 | 6.8 | 6.8 | 8.7 | 5.3 |
| Cure time at 60° C. (min) | 29.7 | 29.8 | 14.5 | 17.7 | 18.5 | 12.9 |
| Shelf life at room temperature (day) | 45 | 10 | 25 | 6 | 15 | 1 |

TABLE 4

Initial Cure Properties with Silver Nanopowders (20 nm)

|  | E-3 | E-9 | E-10 | CE-3 | E-11 | E-12 | CE-4 |
|---|---|---|---|---|---|---|---|
| Onset Temp (° C.) | 70.16 | 85.19 | 85.06 | 72.23 | 57.25 | 60.02 | 54.23 |
| Peak Temp (° C.) | 79.32 | 92.77 | 91.30 | 81.64 | 72.91 | 73.81 | 68.38 |
| Delta H (J/g) | 178.6 | 252.4 | 198.6 | 308.7 | 153.0 | 223.0 | 144.6 |
| Cure time at 60° C. (min) | 18.5 | 32.5 | 37.9 | 12.9 | 10.1 | 8.7 | 5.6 |
| Shelf life at room temperature (day) | 15 | 43 | 47 | 1 | 6 | 10 | 3 hours |

TABLE 5

Initial Cure Properties with Copper Nanopowders (40 nm)

|  | E-4 | CE-1 | E-5 | CE-2 | E-6 | CE-3 |
|---|---|---|---|---|---|---|
| Onset Temp (° C.) | 83.58 | 76.30 | 78.91 | 71.26 | 74.22 | 72.23 |
| Peak Temp (° C.) | 137.65 | 89.95 | 89.51 | 81.89 | 83.24 | 81.64 |
| Delta H (J/g) | 263.6 | 219.6 | 198.9 | 196.2 | 140.1 | 308.7 |
| Cure time at 90° C. (min) | 20.0 | 4.5 | 4.5 | 3.2 | 3.0 | 2.0 |
| Cure time at 70° C. (min) | 30.5 | 11.4 | 12.6 | 6.8 | 8.5 | 5.3 |
| Shelf life at room temperature (day) | 16 | 10 | 9 | 6 | 6 | 1 |

TABLE 6

Initial Cure Properties with Silver Nanopowders (20 nm) or Silver Micropowders (5.0-8.0 micron)

|  | E-9 | CE-5 |
|---|---|---|
| Onset Temp (° C.) | 85.19 | 75.16 |
| Peak Temp (° C.) | 92.77 | 83.05 |
| Delta H (J/g) | 252.4 | 288.6 |
| Cure time at 60° C. (min) | 32.5 | 20.9 |
| Shelf life at room temperature (day) | 43 | 2 |

The complete disclosures of the patents, patent documents, and publications cited herein are incorporated by reference in their entirety as if each were individually incorporated. To the extent that there is any conflict or discrepancy between this specification as written and the disclosure in any document that is incorporated by reference herein, this specification as written will control. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed:

1. A curable, one-part epoxy/thiol resin composition comprising:
   an epoxy/thiol resin mixture comprising:
      an epoxy resin component comprising an epoxy resin having at least two epoxide groups per molecule;
      a thiol component comprising a polythiol compound having at least two primary thiol groups; and
      a nitrogen-containing catalyst for the epoxy resin; and
   silver nanoparticles, copper nanoparticles, or both, dispersed in the epoxy/thiol resin mixture.

2. The curable, one-part epoxy/thiol resin composition of claim 1 which is curable at a temperature of at least 50° C.

3. The curable, one-part epoxy/thiol resin composition of claim 1 wherein the epoxy resin comprises a polyglycidyl ether of a polyhydric phenol, a reaction product of a polyhydric alcohol with epichlorohydrin, an epoxidised (poly) olefinic resin, an epoxidised phenolic novolac resin, an epoxidised cresol novolac resin, a cycloaliphatic epoxy resin, a glycidyl ether ester, a polyglycidyl ester, a urethane modified epoxy resin, or a combination of two or more thereof.

4. The curable, one-part epoxy/thiol resin composition of claim 1 wherein the epoxy resin component is present in an amount of at least 20 wt-% and up to 80 wt-%, based on the total weight of the curable epoxy/thiol resin composition.

5. The curable, one-part epoxy/thiol resin composition of claim 1 wherein the polythiol compound comprises trimethylolpropane tris(beta-mercaptopropionate), trimethylolpropane tris(thioglycolate), pentaerythritol tetrakis(thioglycolate), pentaerythritol tetrakis(beta-mercaptopropionate), dipentaerythritol poly(beta-mercaptopropionate), ethylene glycol bis(beta-mercaptopropionate), a (C1-C12)alkyl polythiol, a (C6-C12)aromatic polythiol, or a combination of two or more thereof.

6. The curable, one-part epoxy/thiol resin composition of claim 1 wherein the thiol component is present in an amount of at least 25 wt-% and up to 70 wt-%, based on a total weight of the curable epoxy/thiol resin composition.

7. The curable, one-part epoxy/thiol resin composition of claim 1 wherein the nitrogen-containing catalyst is capable of activation at temperatures at or above 50° C. to effect the thermal curing of the epoxy resin.

8. The curable, one-part epoxy/thiol resin composition of claim 1 wherein the silver nanoparticles, copper nanoparticles, or both are present in the curable composition in an amount of at least 1 wt-% and up to 10 wt-%, based on the total weight of the curable composition.

9. The curable, one-part epoxy/thiol resin composition of claim 1 wherein the nitrogen-containing catalyst is present in the curable composition in an amount of at least 1 wt-% and up to 5 wt-%, based on the total weight of the curable composition.

10. The curable, one-part epoxy/thiol resin composition of any claim 1 wherein the composition exhibits an electrical conductivity of no more than $10^{-15}$ Siemens per meter.

11. The curable, one-part epoxy/thiol resin composition of claim 1 wherein the silver nanoparticles, copper nanoparticles, or both comprise an average diameter of 500 nanometers or less.

12. A method of curing a curable, one-part epoxy/thiol resin composition comprising:
    providing a curable, one-part epoxy/thiol resin composition of claim 1; and
    heating the curable, one-part epoxy/thiol resin composition to a temperature of at least 50° C.

13. A method of curing a curable, one-part epoxy/thiol resin composition comprising:
    providing a curable, one-part epoxy/thiol resin composition comprising:
        an epoxy resin component comprising:
            an epoxy resin having at least two epoxide groups per molecule;
            a thiol component comprising a polythiol compound having at least two primary thiol groups; and
            a nitrogen-containing catalyst for the epoxy resin; and
        silver nanoparticles, copper nanoparticles, or both, dispersed in the epoxy/thiol resin mixture; and
    heating the curable, one-part epoxy/thiol resin composition to a temperature of at least 50° C.

14. A cured epoxy/thiol resin composition prepared by a method claim 13.

* * * * *

UNITED STATES PATENT AND TRADEMARK OFFICE
CERTIFICATE OF CORRECTION

PATENT NO. : 11,053,348 B2
APPLICATION NO. : 16/471885
DATED : July 6, 2021
INVENTOR(S) : Lin et al.

It is certified that error appears in the above-identified patent and that said Letters Patent is hereby corrected as shown below:

In the Specification

Column 8,
Line 49, delete "IV" and insert -- $R^1$ --, therefor.
Line 64, delete "IV" and insert -- $R^1$ --, therefor.

Column 9,
Line 4, delete "IV" and insert -- $R^1$ --, therefor.
Line 6, delete "IV" and insert -- $R^1$ --, therefor.
Lines 21 & 22, delete "dihydroxydiphenyle thylme thylmethane," and insert
-- dihydroxydiphenylethylmethylmethane, --, therefor.
Lines 24 & 25, delete "dihydroxydiphenylpropylenphenylmethane," and insert
-- dihydroxydiphenylpropylenephenylmethane, --, therefor.
Line 55, delete "R'" and insert -- $R^1$ --, therefor.

Column 10,
Line 2, delete "(R'" and insert -- ($R^1$ --, therefor.
Line 19, delete "epichlorihydrin" and insert -- epichlorohydrin --, therefor.

Column 12,
Lines 34 & 35, delete "2-heptadeoylimidazole" and insert -- 2-heptadecylimidazole --, therefor.
Line 40, delete "isophtholohydrazide," and insert -- isophthalohydrazide, --, therefor.
Line 45, first occurrence, delete "AMICURE" and insert -- AJICURE --, therefor.
Line 45, second occurrence, delete "AMICURE" and insert -- AJICURE --, therefor.
Line 46, delete "AMICURE" and insert -- AJICURE --, therefor.
Line 56, after "LC100", delete ")".

Column 18,
Line 67, delete "2-heptadeoylimidazole" and insert -- 2-heptadecylimidazole --, therefor.

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 11,053,348 B2

Column 19,
Lines 9 & 10, delete "isophtholohydrazide," and insert -- isophthalohydrazide, --, therefor.

Column 21,
Line 32, delete "l/seconds" and insert -- 1/seconds --, therefor.

In the Claims

Column 25,
Line 5, in Claim 10, delete "any claim" and insert -- claim --, therefor.

Column 26,
Line 16, in Claim 14, delete "method" and insert -- method of --, therefor.